US011906099B2

(12) United States Patent
Smith et al.

(10) Patent No.: US 11,906,099 B2
(45) Date of Patent: Feb. 20, 2024

(54) SEAL ON THE INTERSTICE OF DOUBLE-WALLED FIBERGLASS PIPE

(71) Applicant: Phoenix Environmental, Inc., Plymouth, MI (US)

(72) Inventors: Casey Joe Smith, Scottsdale, AZ (US); Blake A. Bowers, Whitmore Lake, MI (US); Michael B. Goodwin, Pinckney, MI (US); Makena Hale, Howell, MI (US)

(73) Assignee: PHOENIX ENVIRONMENTAL, INC., Plymouth, MI (US)

( * ) Notice: Subject to any disclaimer, the term of this patent is extended or adjusted under 35 U.S.C. 154(b) by 400 days.

(21) Appl. No.: 17/040,498

(22) PCT Filed: Mar. 21, 2019

(86) PCT No.: PCT/US2019/023407
§ 371 (c)(1),
(2) Date: Sep. 22, 2020

(87) PCT Pub. No.: WO2019/183378
PCT Pub. Date: Sep. 26, 2019

(65) Prior Publication Data

US 2021/0364105 A1 Nov. 25, 2021

Related U.S. Application Data

(60) Provisional application No. 62/645,862, filed on Mar. 21, 2018.

(51) Int. Cl.
*F16L 7/02* (2006.01)
*F16L 25/14* (2006.01)
(Continued)

(52) U.S. Cl.
CPC .................................... *F16L 7/02* (2013.01); *F16L 9/20* (2013.01); *F16L 25/14* (2013.01); *F16L 37/56* (2013.01);
(Continued)

(58) Field of Classification Search
CPC ..... F16L 7/02; F16L 9/20; F16L 25/14; F16L 21/007; F16L 17/02; F16L 25/10;
(Continued)

(56) References Cited

U.S. PATENT DOCUMENTS 198,489 A * 12/1877 Conlan .................. F16L 25/14 285/123.4
3,913,928 A * 10/1975 Yamaguchi ............ F16L 25/10
(Continued)

FOREIGN PATENT DOCUMENTS

EP 994287 A1 * 4/2000 ............ F16L 17/025

OTHER PUBLICATIONS

International Search Report and Written Opinion dated May 24, 2019 re: Application No. PCT/US2019/023407, pp. 1-5, citing: U.S. Pat. No. 3,964,754 A, US 2009/0315275 A1, U.S. Pat. No. 5,007,666 A, US 2009/0000681 A1, U.S. Pat. No. 3,928,903 A, U.S. Pat. No. 6,305,429 B1.

(Continued)

*Primary Examiner* — William S. Choi
(74) *Attorney, Agent, or Firm* — CANTOR COLBURN LLP

(57) ABSTRACT

A method of sealing the interstice in double-walled pipe includes the steps of applying a first sealing piece to an inner pipe of the double-walled pipe, wherein the first sealing piece covers a portion of the circumference of the inner pipe; and applying a second sealing piece to the inner pipe of the double-walled pipe, wherein the second sealing piece covers the remainder of the circumference of the inner pipe. The method further includes the step of attaching the first sealing (Continued)

piece to the second sealing piece forming a sealer; wherein the sealer is disposed in an annular space located between the inner pipe and an outer pipe. A sealer configured to seal an opening between pipes in a double-walled pipe includes a first sealing piece having a rounded cross-section with an attachment portion configured to engage a corresponding attachment portion disposed on a second sealing piece.

20 Claims, 16 Drawing Sheets

(51) Int. Cl.
*F16L 37/56* (2006.01)
*F16L 39/00* (2006.01)
*F16L 9/19* (2006.01)

(52) U.S. Cl.
CPC ........... *F16L 37/565* (2013.01); *F16L 39/005* (2013.01); *Y10T 29/49826* (2015.01)

(58) Field of Classification Search
CPC . F16L 21/03; F16L 17/025; F16L 7/00; F16L 39/005; F16L 37/56; F16L 37/565
USPC .............................. 285/123.4, 123.1, 123.15
See application file for complete search history.

(56) References Cited

U.S. PATENT DOCUMENTS 3,928,903 A 12/1975 Richardsone et al.
3,964,754 A 6/1976 Murai et al.
4,149,568 A 4/1979 Kuntz et al.
4,556,240 A 12/1985 Yoshida
4,667,505 A * 5/1987 Sharp
4,915,422 A * 4/1990 Chacon ................ F16L 17/025
4,932,257 A 6/1990 Webb
5,007,666 A 4/1991 Kyfes
5,011,064 A 4/1991 Fuss
5,020,810 A * 6/1991 Jobe .......................... F16L 7/00
285/123.1
6,247,500 B1 * 6/2001 McMahon
6,305,429 B1 10/2001 Welch et al.
7,032,933 B2 * 4/2006 Hellman ................ F16L 25/14
9,447,907 B1 * 9/2016 Woodcock
2005/0077727 A1 * 4/2005 Folsom .................. F16L 25/14
2008/0314469 A1 12/2008 Buschhoff
2009/0000681 A1 1/2009 Averbuch et al.
2009/0273180 A1 * 11/2009 Lavalle
2009/0315275 A1 12/2009 Beele
2017/0059078 A1 * 3/2017 Ryan

OTHER PUBLICATIONS

Written Opinion dated May 24, 2019 re: Application No. PCT/US2019/023407, pp. 1-6.

* cited by examiner 26
44
10
44
32

SEAL ON THE INTERSTICE OF DOUBLE-WALLED FIBERGLASS PIPE

TECHNICAL FIELD

The disclosure relates to a method of sealing the interstice of a double-walled pipe and a sealer configured to seal the opening between an annular space in a double-walled pipe.

BACKGROUND

Underground storage tanks and piping are used to store motor fuels, which include biofuels, chemicals, and other petroleum products. Underground storage tanks were developed to handle burial site and loading conditions including leak free joints, corrosion resistance, and able to withstand high pressures with low friction flow rates.

In 2015, the Environmental Protection Agency (EPA) updated Underground Storage Tank Regulations (including piping), which adds secondary containment release and detection requirements for new and replaced tanks and piping. Regulated tanks, such as those used to store petroleum and chemicals, and piping are double walled with the ability to monitor the interstitial space for integrity, either hydraulically, pneumatically, or with sensors. The pipes have to be tested for leakage periodically. In some states, interstitial spaces must be monitored continuously. It can be challenging to test for leakage in the interstitial spaces on double-walled pipe because the pipes are not typically sealed. Often, after initial testing, the interstice is open to containment sumps in a permanent way.

An improved system and method for sealing the interstitial spaces in double-walled pipe is desired.

SUMMARY

Disclosed herein are systems and methods for sealing the interstitial space in double-walled fiberglass pipe and a double-walled pipe having a sealer disposed between an annular space therein.

A method of sealing the interstice in double-walled pipe comprises the steps of: applying a first sealing piece to an inner pipe of the double-walled pipe, wherein the first sealing piece covers a portion of the circumference of the inner pipe; applying a second sealing piece to the inner pipe of the double-walled pipe, wherein the second sealing piece covers the remainder of the circumference of the inner pipe; and attaching the first sealing piece to the second sealing piece forming a sealer; wherein the sealer is disposed in an annular space located between the inner pipe and an outer pipe of the double-walled pipe.

A sealer configured to seal an opening between pipes in a double-walled pipe comprises: a first sealing piece having a rounded cross-section with an attachment portion configured to engage a corresponding attachment portion disposed on a second sealing piece.

A double-walled pipe having a sealer between an annular space comprises: an inner pipe; an outer pipe disposed around the inner pipe, wherein the inner pipe extends beyond the outer pipe; a first sealing piece having a round cross-section with an attachment portion configured to engage a corresponding attachment portion on a second sealing piece, wherein the first sealing piece and the second sealing piece form a sealer; and wherein the sealer is disposed in the annular space between the inner pipe and the outer pipe.

A method of sealing the interstice in double-walled pipe, the method including the following steps: applying a sealing piece to an inner pipe of the double-walled pipe, wherein the sealing piece covers a circumference of the inner pipe; wherein the sealing piece is disposed in an annular space located between the inner pipe and an outer pipe.

The above described and other features are exemplified by the following figures and detailed description.

BRIEF DESCRIPTION OF THE DRAWINGS

Referring now to the figures, which are exemplary embodiments, and wherein like elements are numbered alike:

FIG. 8 is an isometric side profile of a double-walled pipe with first and second sealing pieces attached thereto wherein the attachment portion of the first and second sealing pieces are similar;

FIG. 9 is an isometric side profile of a double-walled pipe with a sealing piece attached thereto wherein the attachment portion of the first and second sealing pieces are similar;

DETAILED DESCRIPTION OF THE DRAWINGS

Figure 1:
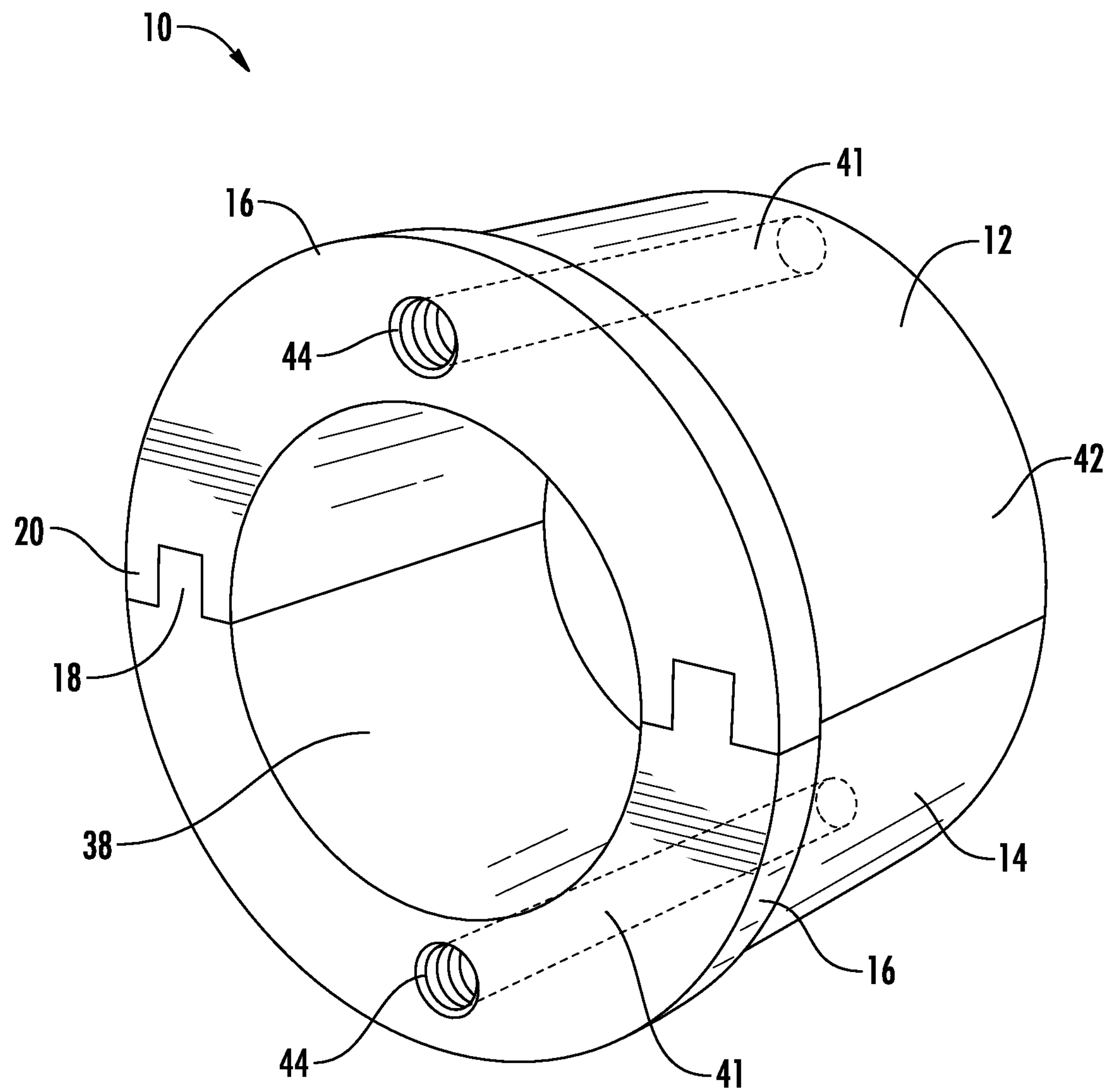
FIG. 1 is an isometric view of a sealing piece as disclosed herein.

Disclosed herein is a method of sealing an interstice in double-walled pipe and a sealer configured to seal an opening between pipes in a double-walled pipe. Such a method and system can allow the space located between the two pipes to be monitored for the occurrence of leakages in either pipe. The space can be monitored with vacuum, pressure, and/or liquid sensors. The sealer can comprise one piece, two pieces, or greater than or equal to two pieces. A multi-piece system can be retrofitted to existing underground storage tanks and pipes, while a single piece system can be configured to be attached to new underground storage tanks and pipes.

FIGS. 1 to 11 show the sealer and various pieces thereof as disclosed herein. A method of sealing the interstice 22 in a double-walled pipe 24 can include applying a first sealing piece 12 to an inner pipe 26 of the double-walled pipe 24. The first sealing piece 12 can cover a portion of the circumference of the inner pipe 26. A second sealing piece 14 can be applied to the inner pipe 26 of the double-walled pipe 24. The second sealing piece 14 can cover the remainder of the circumference of the inner pipe 26. Then, the first sealing piece 12 can be attached to the second sealing piece 14 forming a sealer 10.

The sealer 10 can be disposed in the interstice, e.g., an annular space 22 located between the inner pipe 26 and an outer pipe 32.

Figure 3:
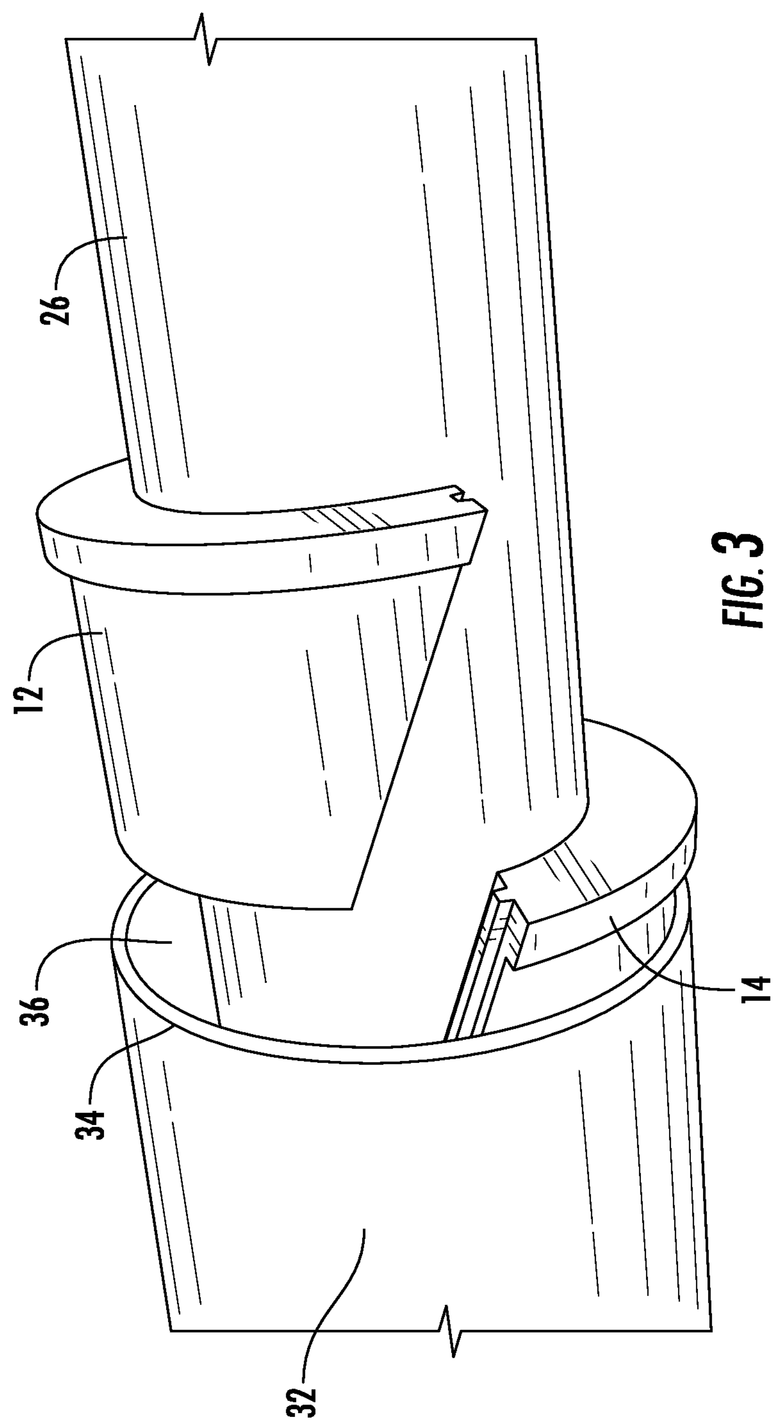
FIG. 3 is an isometric side profile of a double-walled pipe with first and second sealing pieces attached thereto.
Figure 4:
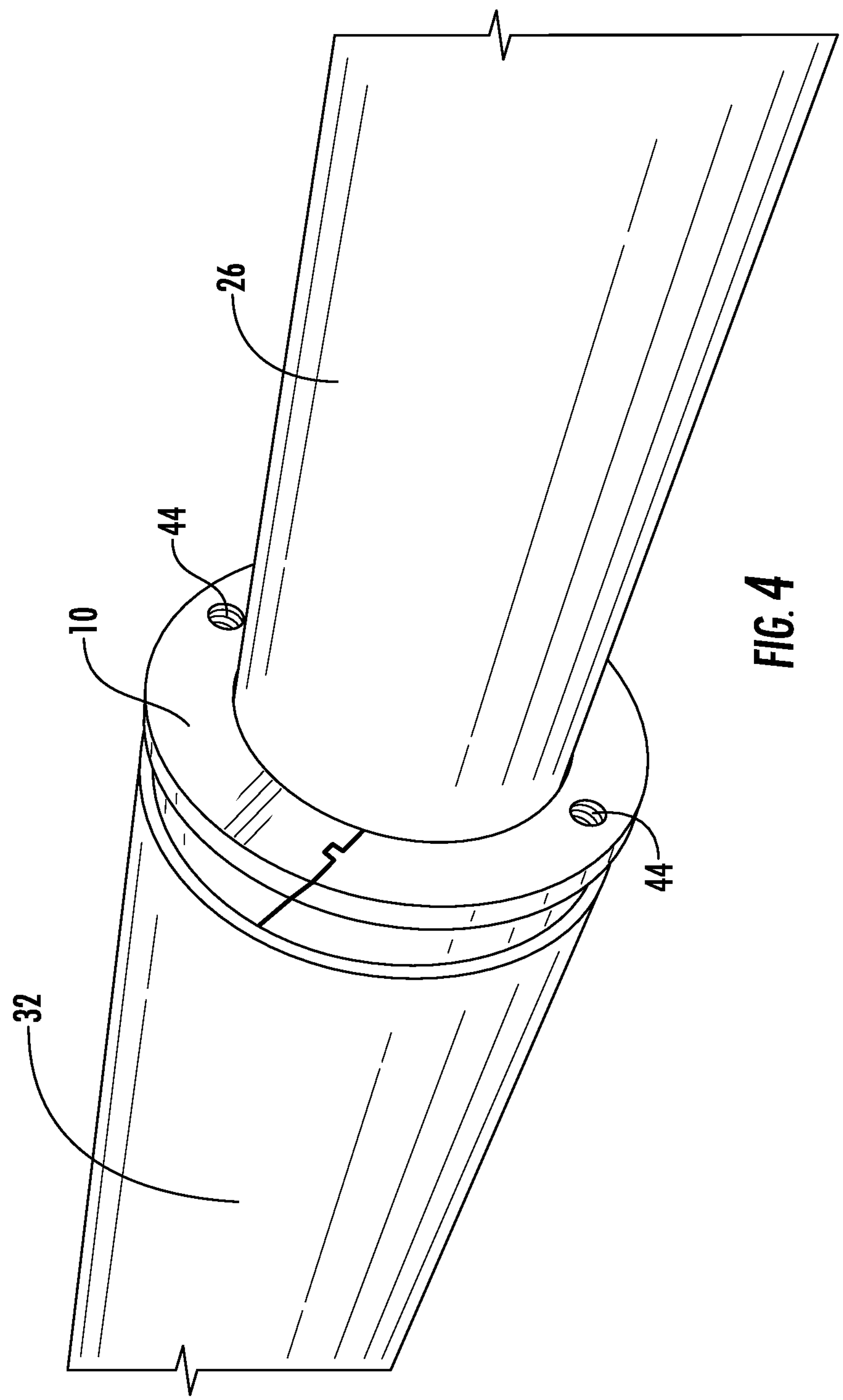
FIG. 4 is an isometric side profile of a double-walled pipe with a sealing piece attached thereto and the first sealing piece connected to the second sealing piece.
Figure 8:
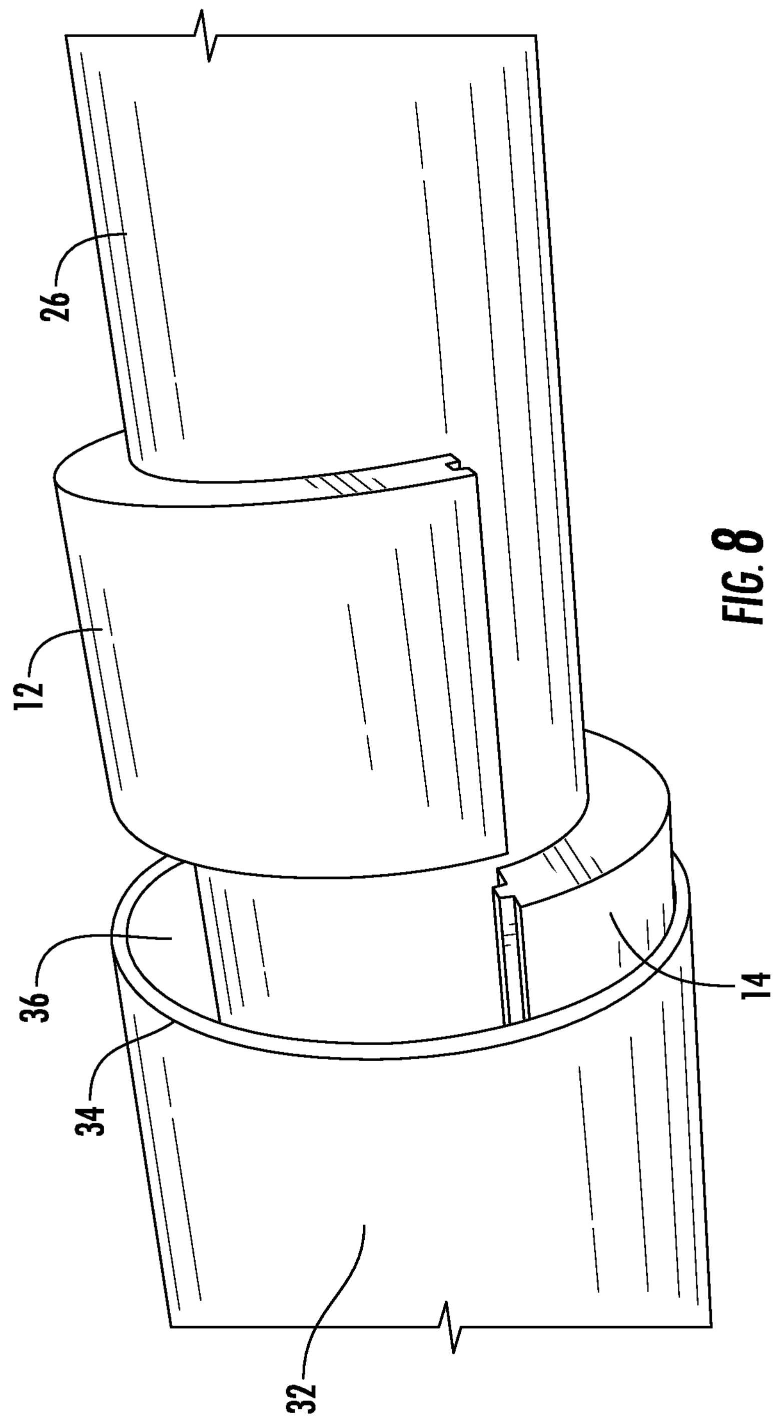
Figure 9:
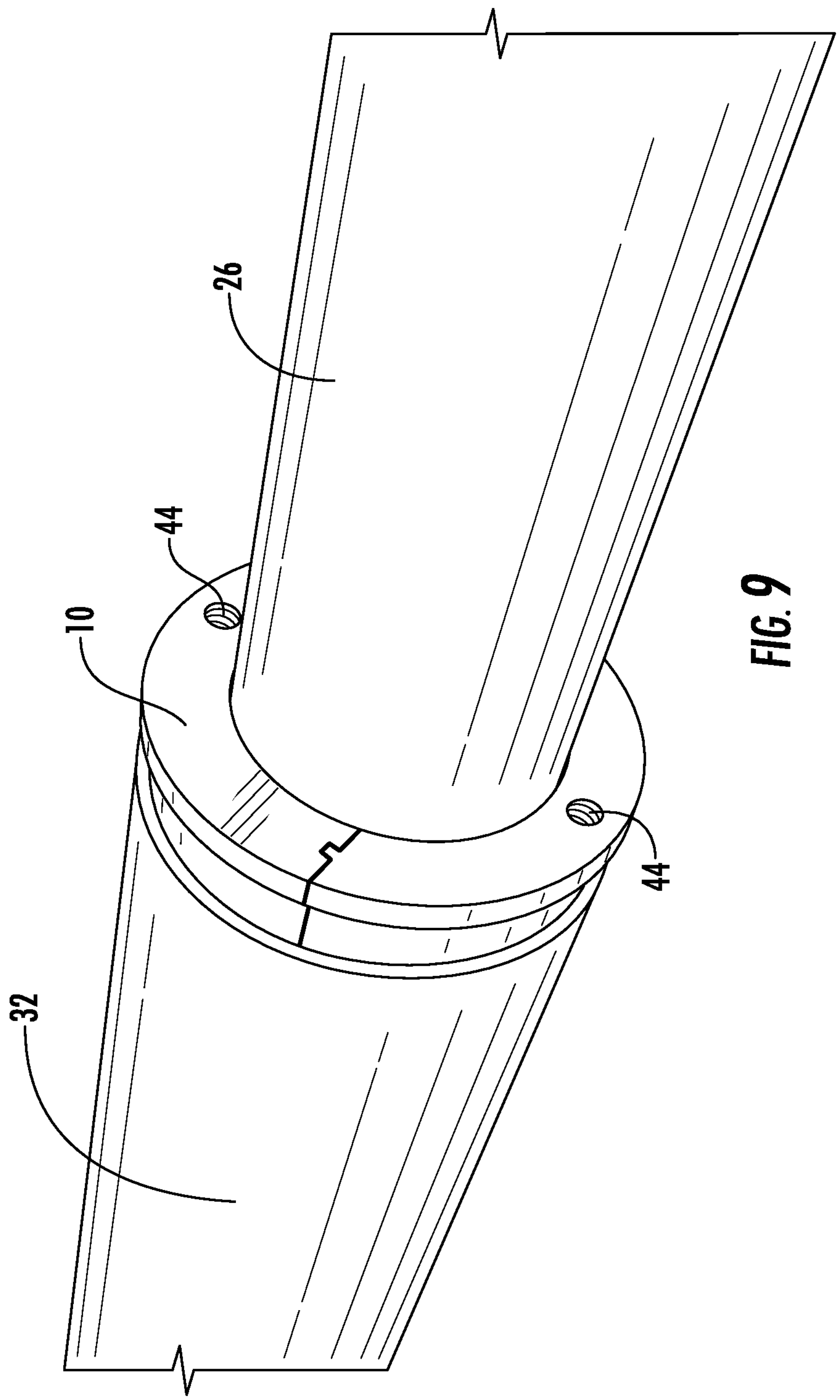

As seen in FIG. 3, the outer surface of the first sealing piece 12 is disposed between the inner pipe 26 and the outer pipe 32 and at an angle relative to the outer surface of the second sealing piece 14. For example, the sealing pieces 12, 14 may be disposed at an angle of 30° or similar. It is also possible for both the first sealing piece 12 and the second sealing piece 14 to have mating surfaces disposed at substantially a right angle, as seen in FIGS. 8 and 9, for example.

Figure 2:
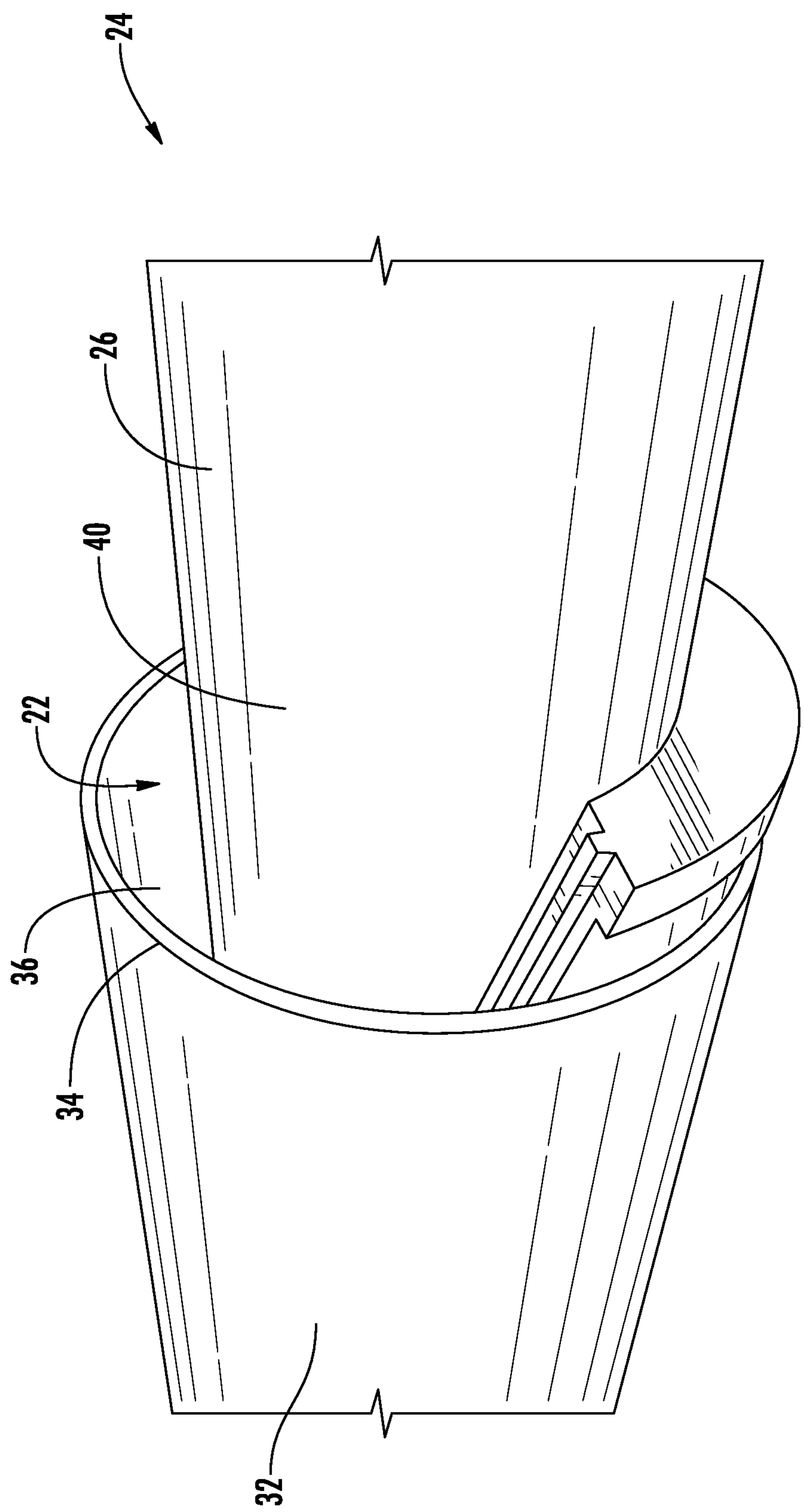
FIG. 2 is an isometric side profile of a double-walled pipe with a portion of a sealing piece attached thereto.

The first sealing piece 12 and the second sealing piece 14 can each contain a lip portion 16 configured to engage with an outer rim 34 on the outer pipe 32 forming a seal around the annular space 22 shown in FIGS. 2 and 3. A portion of the sealer 10, opposite the lip portion 16, can extend into the annular space 22 between the inner pipe 26 and the outer pipe 32.

Greater than or equal to half of a length of the sealer 10 can be disposed in the annular space 22. The first sealing piece 12 and the second sealing piece 14 can be connected with tongue 18 and groove portions 20 located on each of the first sealing piece 12 or the second sealing piece 14. An attachment portion 18, 20, such as tongue and groove portions 18, 20, can be located on either of or both of the first sealing piece 12 or the second piece 14 disposed along surfaces thereof and facing each other. The sealer 10 can be of unitary construction.

The sealer 10 can be composed of greater than or equal to two pieces, where the pieces can be connected or attached to one another with the methods and constructions disclosed herein. For example, the first piece 12 and the second piece 14 can be connected by an adhesive, at least one screw, at least one clamp, at least one O ring, at least one retainer screw, or a combination comprising at least one of the foregoing. The pieces in a configuration with greater than two pieces can be connected with an adhesive, at least one screws at least one clamps at least one O ring, at least one retainer screw, or a combination comprising at least one of the foregoing. The sealer 10 can be removeably attached to the inner piper 26 and the outer pipe 32. An outer surface 42 of the sealer 10 can be flush with an inner surface 36 of the outer pipe 32. An inner surface 38 of the sealer 10 can be flush with an outer surface 40 of the inner pipe 26. disposed along the surfaces of the first and second sealing pieces that face each other The sealer 10 can comprise a material compatible with that of the double-walled pipe. The sealer 10 can be configured to seal an opening (i.e., annular space) or interstice 22 between pipes in a double-walled pipe 24 with the sealer 10 comprising a first sealing piece 12 having a rounded cross-section with an attachment portion 20 configured to engage a corresponding attachment portion 18 on a second sealing piece 14.

Figure 10:
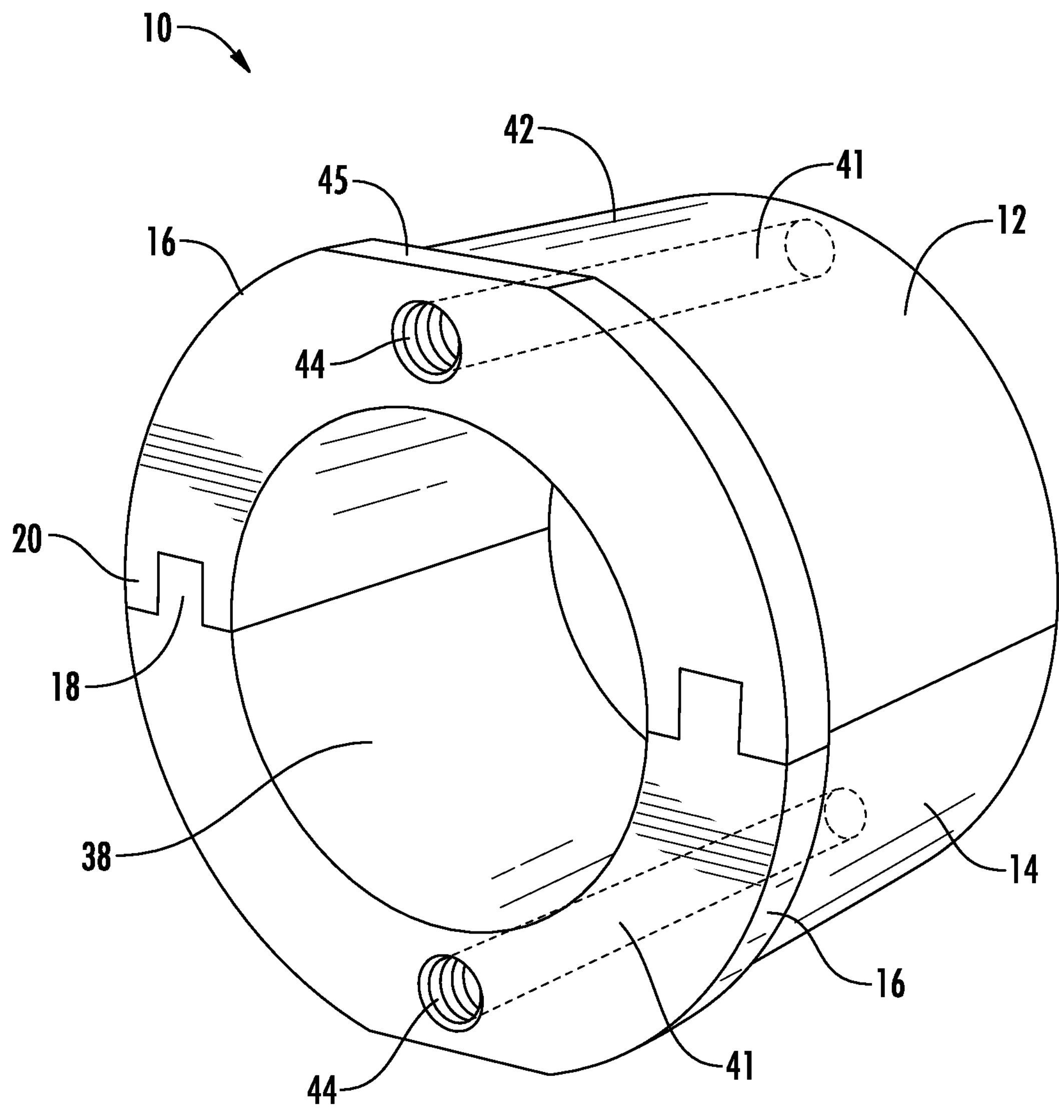
FIG. 10 is an isometric view of a sealing piece as disclosed herein.
Figure 11:
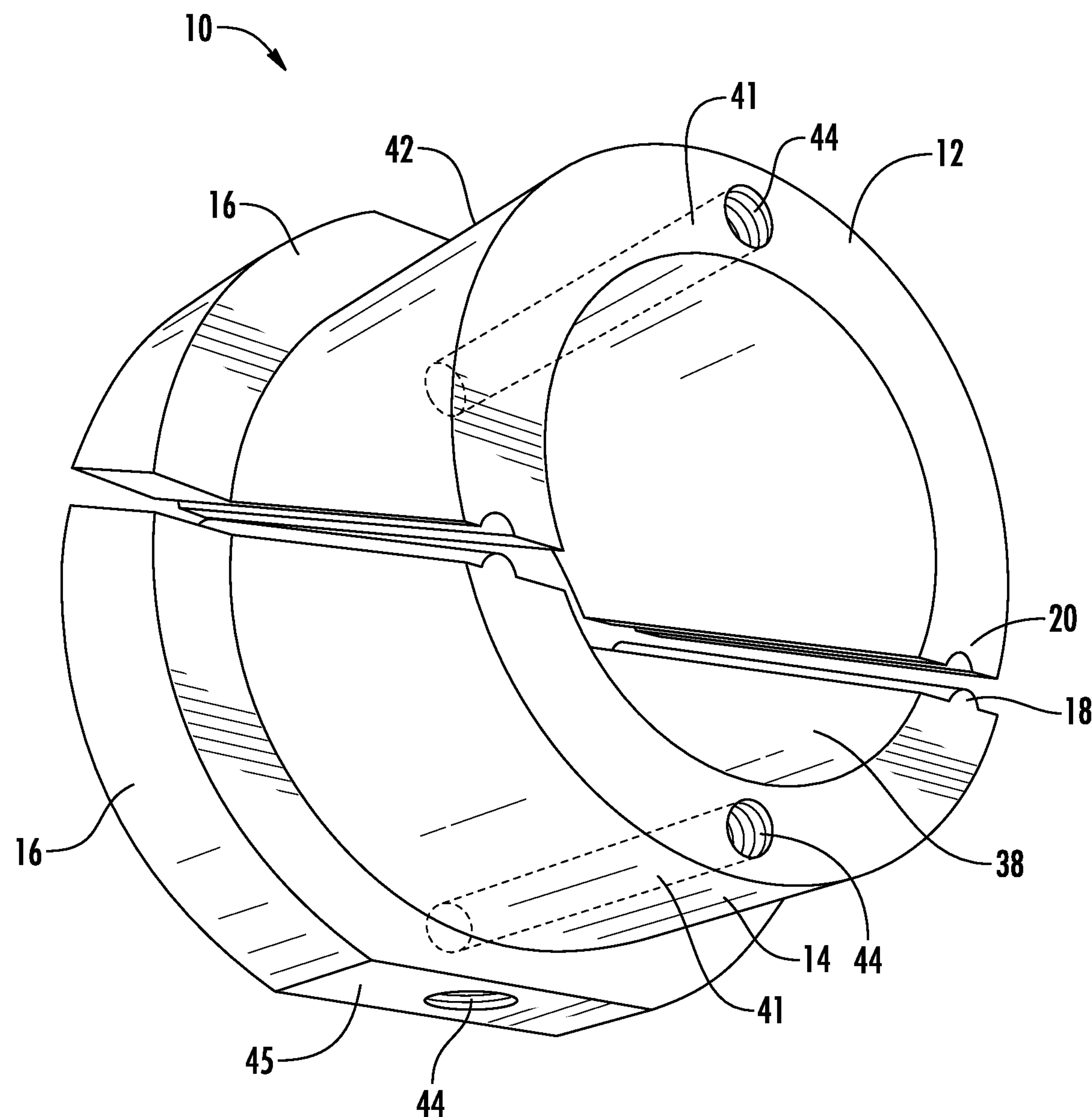
FIG. 11 is a rear view of the sealing piece of FIG. 10.

As seen in FIGS. 10 and 11, part of the lip portion 16 of each of the first sealing piece 12 and the second sealing piece 14 alternatively can have a component 45 that is substantially flat. This flat component 45 may be located at or near the top of the sealing piece as seen in FIGS. 10 and 11.

Figure 5:
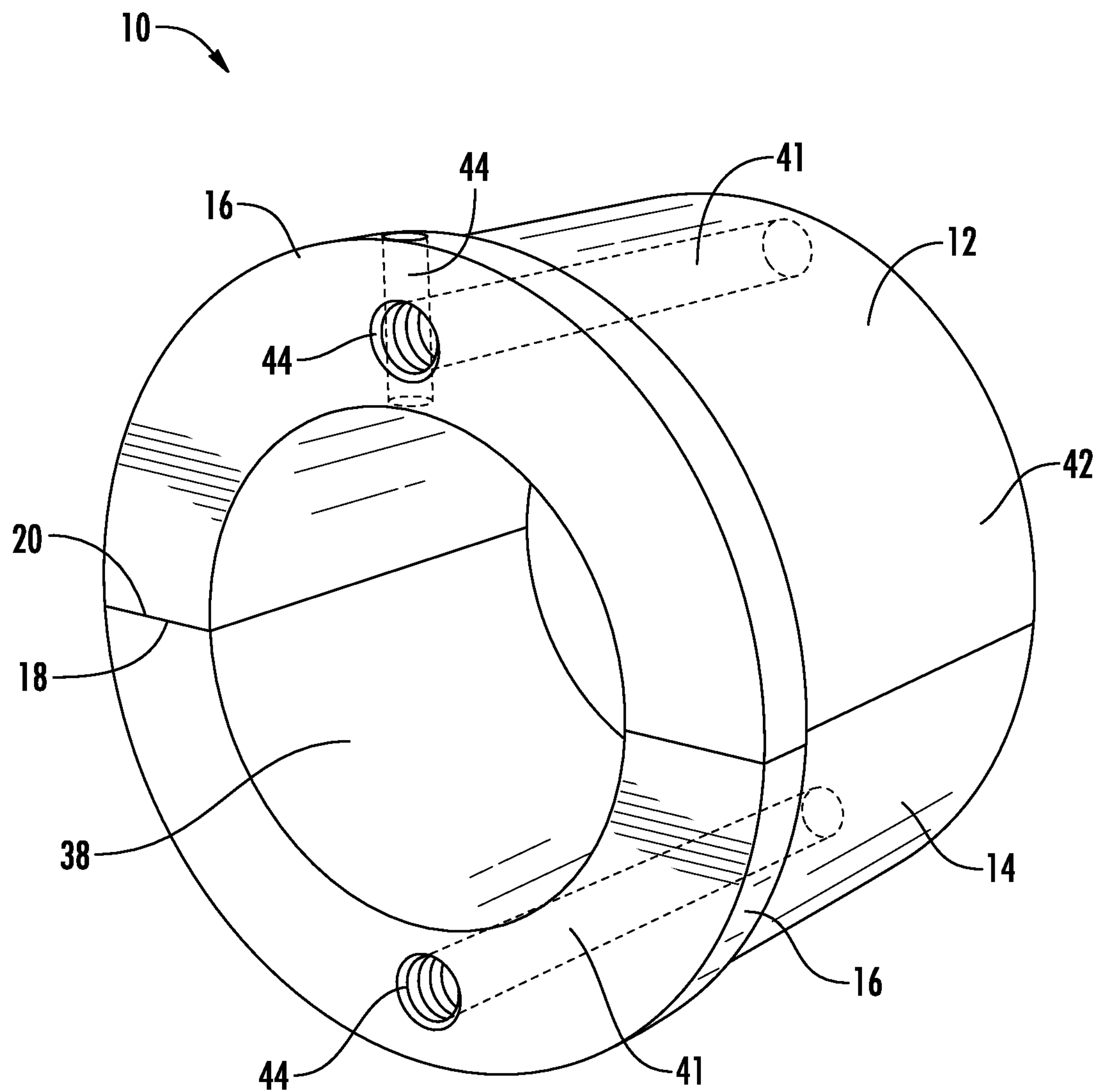
FIG. 5 is an isometric view of a sealing piece as disclosed herein.
Figure 6:
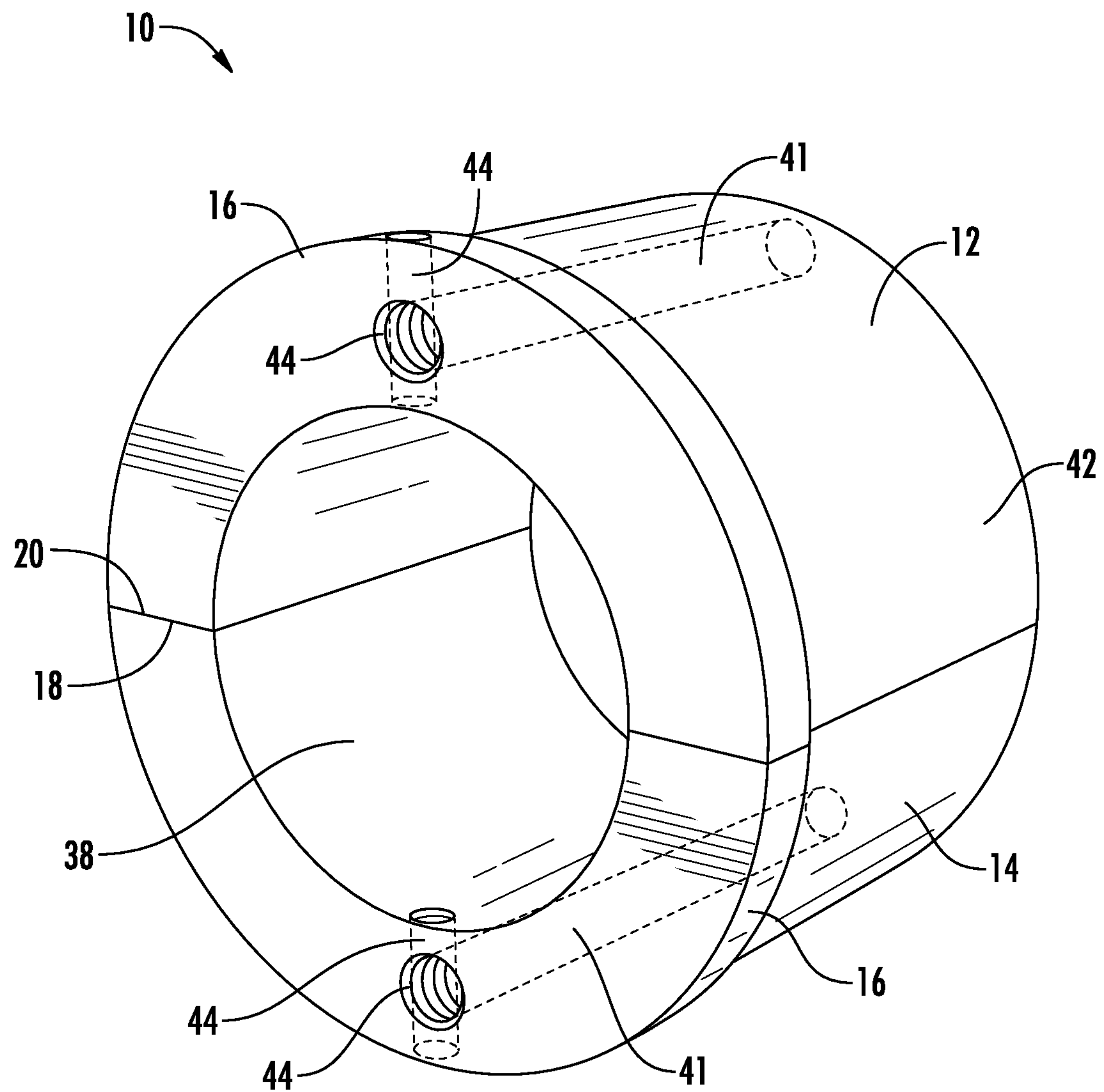
FIG. 6 is an isometric view of a sealing piece as disclosed herein.
Figure 12:
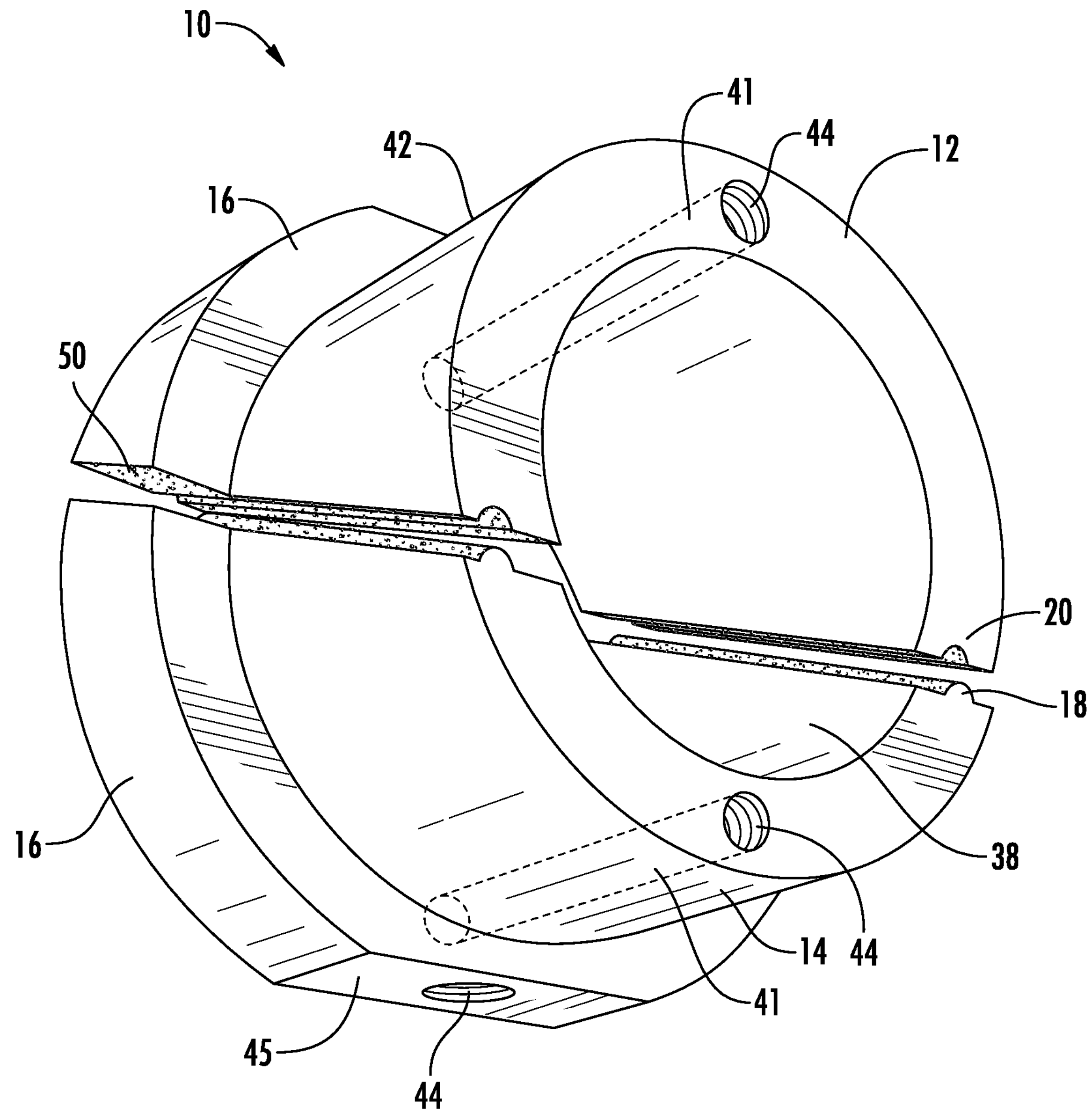
FIG. 12 is an isometric view of a sealing piece as disclosed herein with a connection component to attach the first sealing piece with the second sealing piece.

The first sealing piece 12 and the second sealing piece 14 can be connected such that the attachment portion 18, 20 is configured as a male and female engagement with a tongue and groove configuration 18, 20, as shown in FIG. 1. It is also possible, as seen in FIGS. 5 and 6, that each of the first sealing piece 12 and the second sealing piece 14 can have substantially planar and parallel mating surfaces that make up the attachment portion 18, 20 instead of a male and female engagement. With this configuration seen in FIGS. 5 and 6, the first sealing piece 12 and the second sealing piece 14 would be held together with an adhesive 50, as seen in FIG. 12, such as glue to secure attachment portion 18 of first sealing piece 12 to attachment portion 20 of second sealing piece 14.

Figure 13:
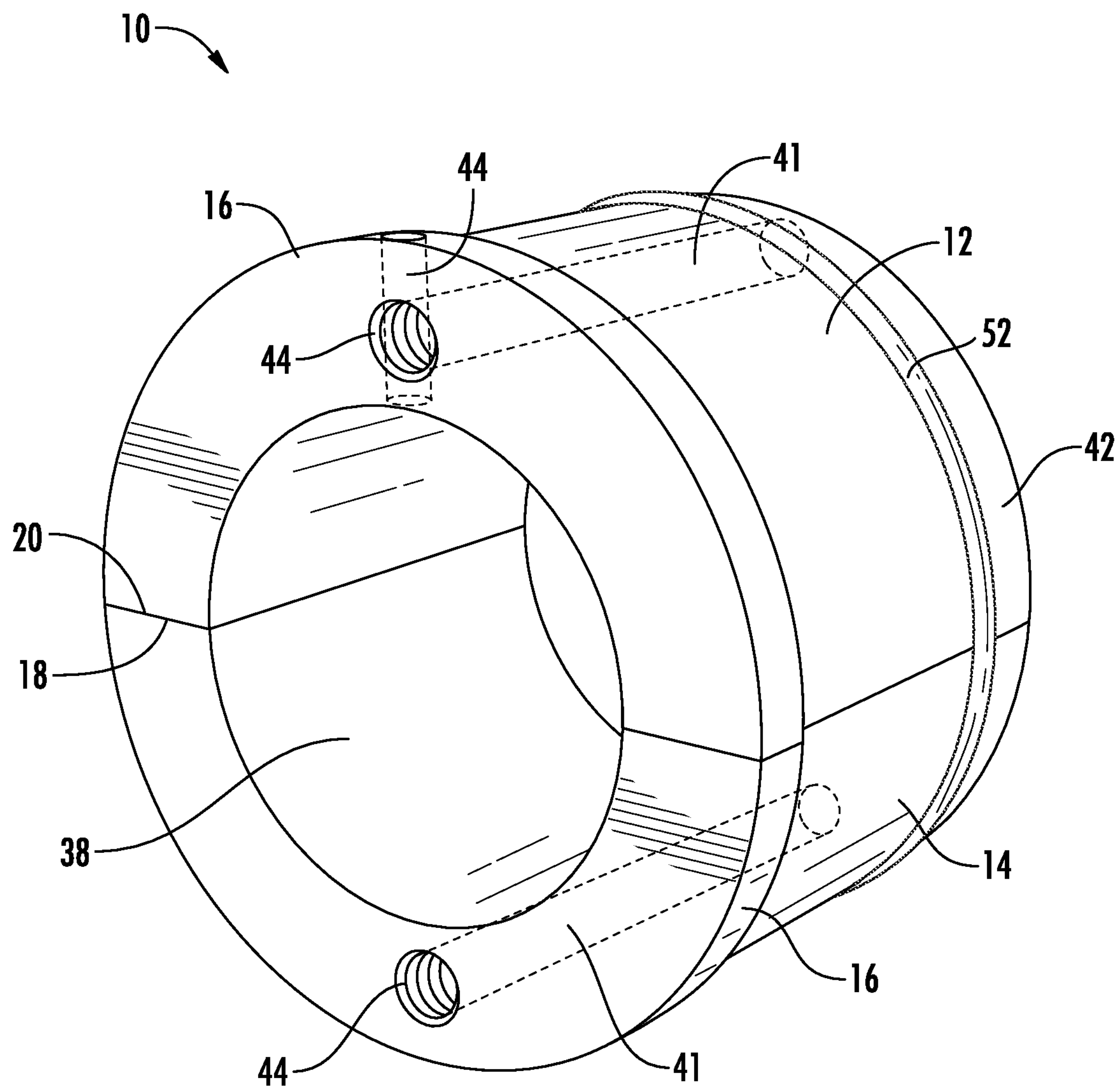
FIG. 13 is a rear view of the sealing piece of FIG. 10 having a connection component attaching the first sealing piece with the second sealing piece.
Figure 14:
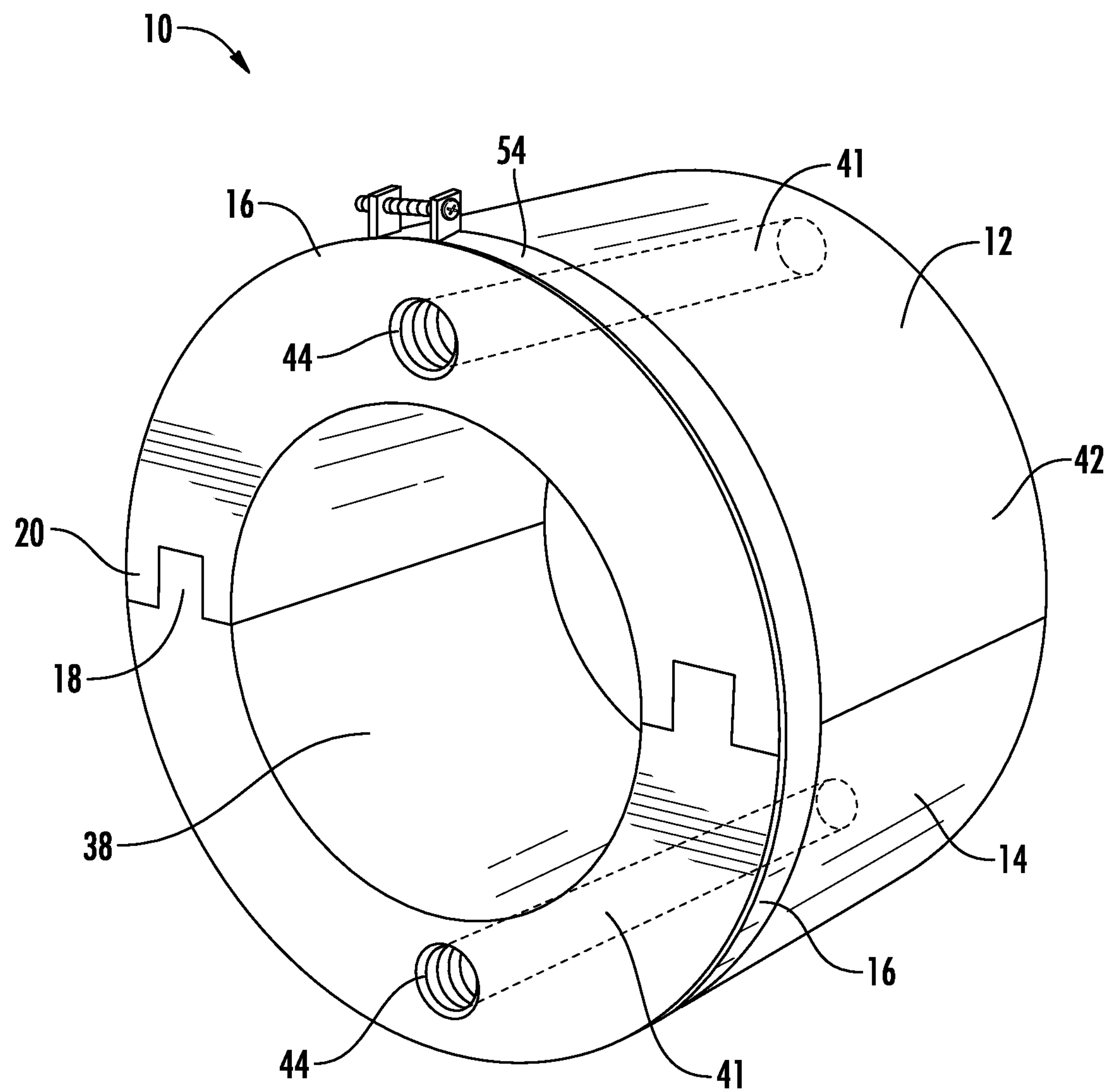
FIG. 14 is an isometric view of the sealing piece of FIG. 10 having a connection component attaching the first sealing piece with the second sealing piece.
Figure 15:
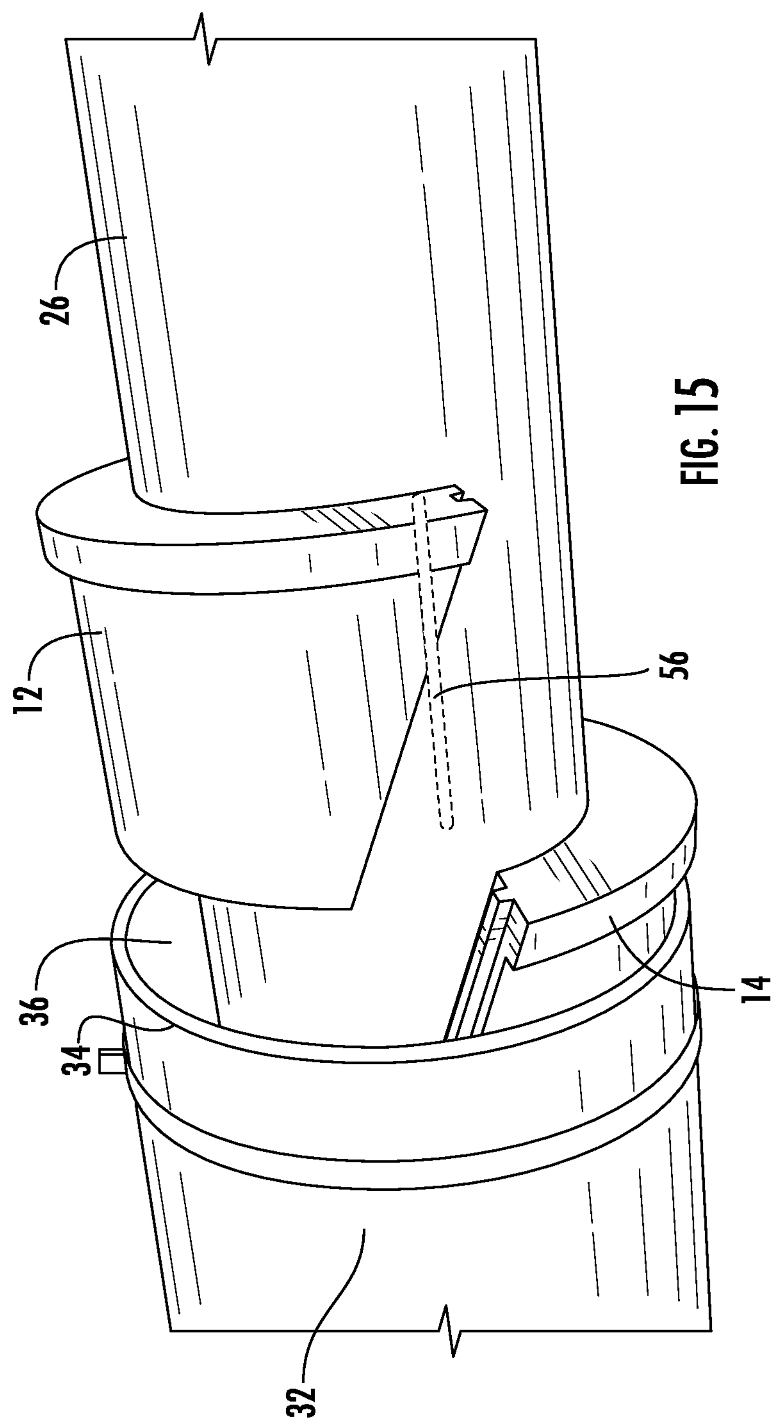
FIG. 15 is an isometric side profile of a double-walled pipe with first and second sealing pieces attached thereto having a connection component.
Figure 16:
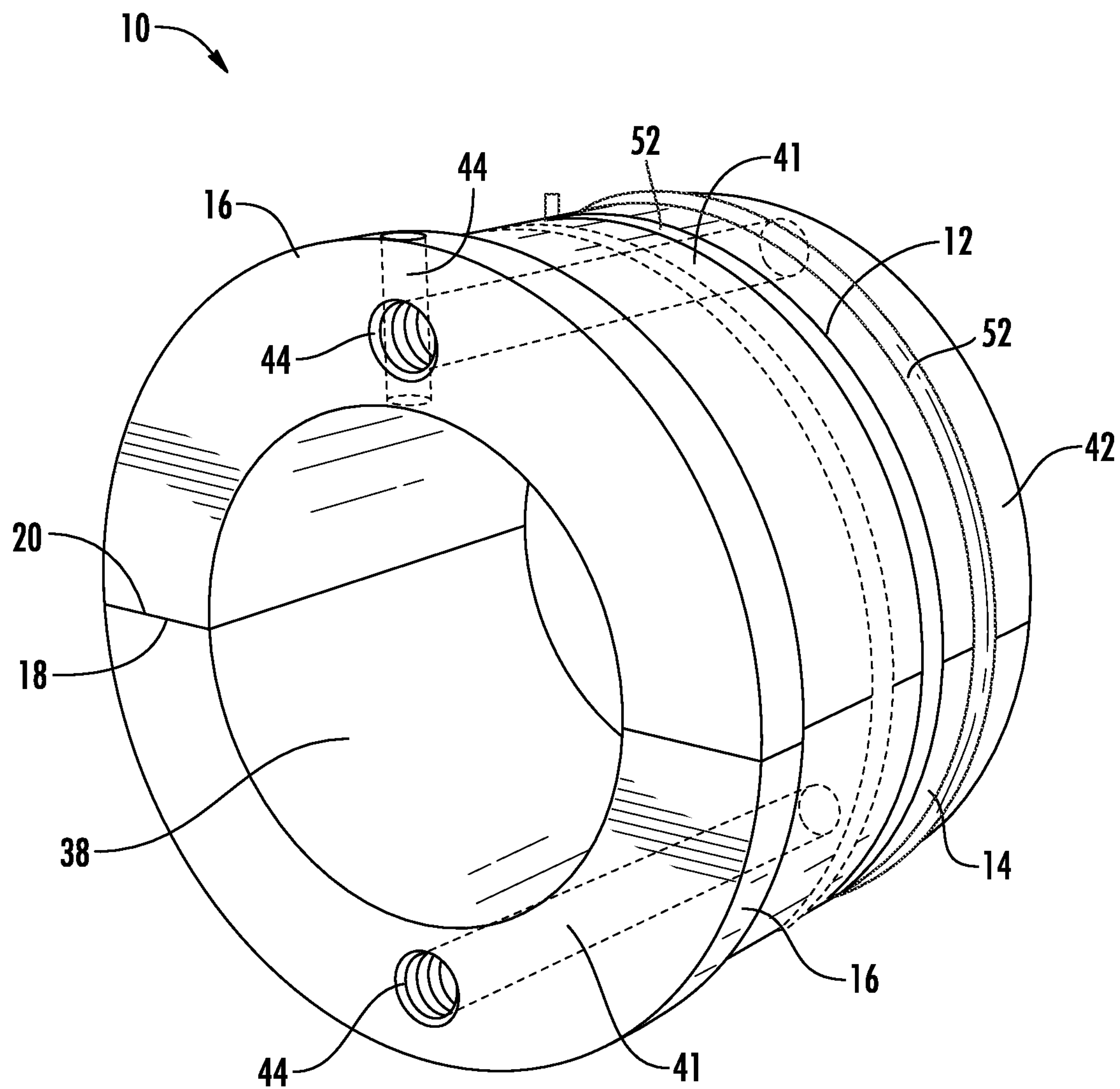
FIG. 16 is an isometric view of the sealing piece of FIG. 10 having a connection component attaching the first sealing piece with the second sealing piece.

The first sealing piece 12 and the second sealing piece 14 can be connected via an adhesive, screws, clamps, O rings, retainer screws, or a combination comprising at least one of the foregoing, as seen in FIGS. 13-16. If the first sealing piece 12 and second sealing piece 14 are held together via an O ring 52, as seen in FIG. 13, or via multiple O rings 52, as seen in FIG. 16, then one O ring 52 could be placed in grooves disposed on the inside of the pipe fitting and on the outside of the pipe fitting. O rings 52 could be placed around both pieces of the sealer 10 as well as the pipe.

The first sealing piece 12 and the second sealing piece 14 could be made airtight with a sealer such as silicone and the entire sealer 10 then would slide into the interstice 22. The sealer 10 could be secured by a clamp 54, as shown in FIG. 14, or screws 56, as shown in FIG. 15, to hold in place either temporarily or semi permanently. The piece could be removed at a later date if necessary.

A double-walled pipe 24 having a sealer disposed between an annular space 22 can comprise an inner pipe 26 and an outer pipe 32 disposed around the inner pipe 26, wherein the inner pipe 26 extends out of or beyond the outer pipe 32. A first sealing piece 12 having a round cross-section with an attachment portion 20 can be configured to engage a corresponding attachment portion 18 on a second sealing piece 14, wherein the first sealing piece 12 and the second sealing piece 14 form a sealer 10. The sealer 10 can be disposed in the annular space 22 between the inner pipe 26 and the outer pipe 32.

Figure 7:
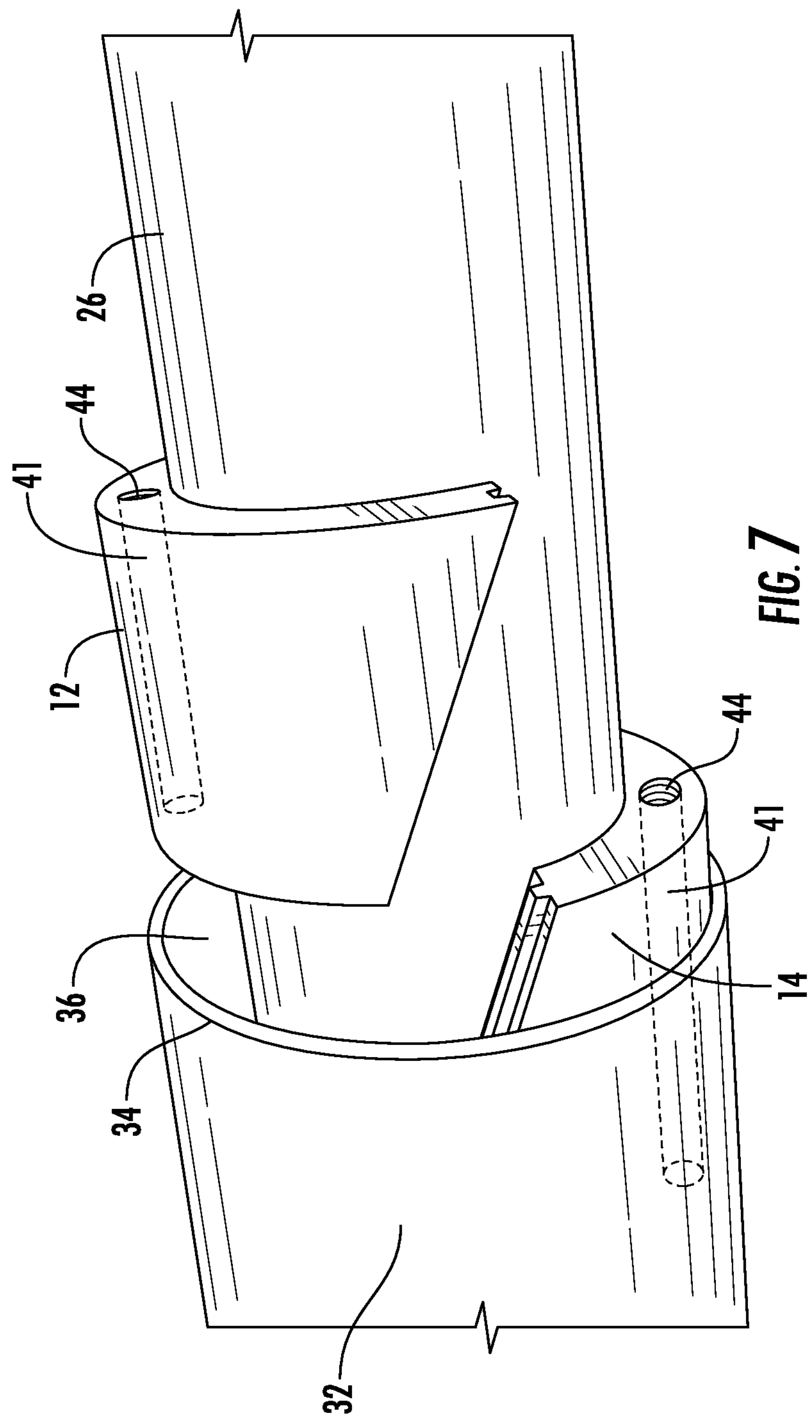
FIG. 7 is an isometric side profile of a double-walled pipe with first and second sealing pieces attached thereto wherein the lip portion is removed.

The sealer 10 can be removeably attached to the inner pipe 26 and the outer pipe 32. The first sealing piece 12 and the second sealing piece 14 can each contain a lip portion 16 configured to engage with an outer rim 34 on the outer pipe 32 forming a seal around the annular space 22. An outer surface 42 of the sealer 10 can be flush with an inner surface 36 of the outer pipe 32. An inner surface 38 of the sealer 10 can be flush with an outer surface 40 of the inner pipe 26. As seen in FIGS. 7 and 8, the outer surface 42 of the sealer 10 is flush with an inner surface 36 of the outer pipe 32 wherein the first sealing piece 12 and the second sealing piece 14 are also flush with the outer rim 34 on the outer pipe 32 to form a seal around the annular space 22. Thus, the lip portion 16 that extends around the outer rim 34 is eliminated. Alternatively, the lip portion 16 of at least one of the first sealing piece 12 and the second sealing piece 14 extends beyond one of the sealing pieces 12. The lip portion 16 may also extend from at least one or both of the sealing pieces 12, 14.

The sealer 10 can include none, at least one thread 44, or a plurality of threads 44 disposed along the top surface of one or more sealing piece, the front surface of one or more sealing piece, or a mixture thereof as seen in FIGS. 1, 5, and 6. At least one, none, or all of the threads 44 may be plugged with a regular pipe plug (not shown) or similar device. The first sealing piece 12 and the second sealing piece 14 may each include a first thread 44 disposed on a top surface and a second thread 44 disposed on a front surface.

As seen in FIGS. 1, 5, and 6, at least one of the threads 44 disposed on any of the front and top surfaces can be connected to an interstitial access port or port 41 that may extend along a longitudinal axis of the sealing piece 12, 14 and extend from the thread 44. These ports 41 are configured to provide access or communication to the interstice 22 in the double-walled pipe 24. With the threads 44 being disposed along the first sealing piece 12 and the second sealing piece 14, a user may have the option of accessing the interstice 22 and plugging any, none, all, or a mixture of the threads 44 based on desirability. A method of sealing the interstice 22 in double-walled pipe 24 can include applying a sealing piece 10 to an inner pipe 26 of the double-walled pipe 24, wherein the sealing piece 10 covers a circumference of the inner pipe 26. The sealing piece 10 can be disposed in an annular space 22 located between the inner pipe 26 and an outer pipe 32. The sealing piece 10 can comprise greater than or equal to two pieces. When the pieces are joined together, the pieces can form a sealing piece 10.

The system and methods disclosed herein include at least the following aspects:

Aspect 1: A method of sealing the interstice in double-walled pipe, comprising: applying a first sealing piece to an inner pipe of the double-walled pipe, wherein the first sealing piece covers a portion of the circumference of the inner pipe; applying a second sealing piece to the inner pipe of the double-walled pipe, wherein the second sealing piece covers the remainder of the circumference of the inner pipe; and attaching the first sealing piece to the second sealing piece forming a sealer; wherein the sealer is disposed in an annular space located between the inner pipe and an outer pipe.

Aspect 2: The method of Aspect 1, wherein the first sealing piece and the second sealing piece each contain a lip portion configured to engage with an outer rim on the outer pipe forming a seal around the annular space.

Aspect 3: The method of Aspect 2, wherein a portion of the sealer, opposite the lip portion, extends into the annular space between the inner pipe and the outer pipe.

Aspect 4: The method of any of the preceding aspects, wherein greater than or equal to half of a length of the sealer is disposed in the annular space.

Aspect 5: The method of any of the preceding aspects, wherein the first sealing piece and the second sealing piece are connected with tongue and groove portions located on each of the first sealing piece or the second sealing piece.

Aspect 6: The method of any of the preceding aspects, wherein the first piece and the second piece are connected by an adhesive, screws, clamps, or a combination comprising at least one of the foregoing.

Aspect 7: The method of any of the preceding aspects, wherein the sealer is removeably attached to the inner piper and the outer pipe.

Aspect 8: The method of any of the preceding aspects, wherein an outer surface of the sealer is flush with an inner surface of the outer pipe.

Aspect 9: The method of any of the preceding aspects, wherein an inner surface of the sealer is flush with an outer surface of the inner pipe.

Aspect 10: The method of any of the preceding aspects, wherein the sealer comprises a material compatible with that of the double-walled pipe.

Aspect 11: A sealer configured to seal an opening between pipes in a double-walled pipe, comprising: a first sealing piece having a rounded cross-section with an attachment portion configured to engage a corresponding attachment portion on a second sealing piece.

Aspect 12: The sealer of Aspect 11, wherein the first sealing portion and the second sealing portion are connected with a tongue and groove configuration.

Aspect 13: The sealer of Aspect 11, wherein the first sealing portion and the second sealing portion are connected via an adhesive, screws, clamps, O rings, retainer screws, or a combination comprising at least one of the foregoing.

Aspect 14: A double-walled pipe having a sealer between an annular space, comprising: an inner pipe; an outer pipe disposed around the inner pipe, wherein the inner pipe extends out of the outer pipe; a first sealing piece having a round cross-section with an attachment portion configured to engage a corresponding attachment portion on a second sealing piece, wherein the first sealing piece and the second sealing piece form a sealer; and wherein the sealer is disposed in the annular space between the inner pipe and the outer pipe.

Aspect 15: The double-walled pipe of Aspect 14, wherein the sealer is removeably attached to the inner pipe and the outer pipe.

Aspect 16: The double-walled pipe of Aspect 14 or Aspect 15, wherein the first sealing piece and the second sealing piece each contain a lip portion configured to engage with an outer rim on the outer pipe forming a seal around the annular space.

Aspect 17: The double-walled pipe of any of Aspects 14-16, wherein an outer surface of the sealer is flush with an inner surface of the outer pipe.

Aspect 18: The double-walled pipe of any of Aspects 14-17, wherein an inner surface of the sealer is flush with an outer surface of the inner pipe.

Aspect 19: The double-walled pipe of any of Aspects 14-18, wherein at least one of the first sealing piece and the second sealing piece includes a thread disposed on at least one of a top surface and a front surface.

Aspect 20: The double-walled pipe of any of Aspects 14-19, wherein the first sealing piece and the second sealing piece include a first thread disposed on a top surface and a second thread disposed on a front surface.

Aspect 21: The double-walled pipe of any of Aspects 14-20, wherein at least one of the threads disposed on the front surface of the first sealing piece and the second sealing piece is connected to an access port extending from the thread and along a longitudinal axis of the sealing piece configured to provide access to the interstice in double-walled pipe.

Aspect 22: A method of sealing the interstice in double-walled, pipe, comprising: applying a sealing piece to an inner pipe of the double-walled pipe, wherein the sealing piece covers a circumference of the inner pipe; wherein the sealing piece is disposed in an annular space located between the inner pipe and an outer pipe.

Aspect 23: The method of Aspect 22, wherein the sealing piece comprises greater than or equal to two pieces, and wherein when joined together, the pieces form a sealing piece.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 volume percent or, more specifically, 5 volume percent to 20 volume percent", is inclusive of the endpoints and all intermediate values of the ranges of "5 volume percent to 25 volume percent," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

With respect to the figures, it is noted that these figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the description for the sake of clarity, these terms are intended to refer only to the particular structure of the embodiments selected for illustration in the drawings, and are not intended to define or limit the scope of the disclosure. In the drawings and the description herein, it is to be understood that like numeric designations refer to components of like function.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of sealing an annular space in double-walled pipe including the following steps:

applying a first sealing piece to an inner pipe of double-walled pipe, wherein the first sealing piece covers a portion of the circumference of the inner pipe;

applying a second sealing piece to the inner pipe of double-walled pipe, wherein the second sealing piece covers the remainder of the circumference of the inner pipe, wherein at least one of the first sealing piece and the second sealing piece includes a thread disposed on at least one of a top surface and a front surface; and attaching the first sealing piece to the second sealing piece forming a sealer;

wherein the sealer is disposed in the annular space located between the inner pipe and an outer pipe.

2. The method of claim 1, wherein the first sealing piece and the second sealing piece each contain a lip portion configured to engage with an outer rim on the outer pipe forming a seal around the annular space.

3. The method of claim 2, wherein a portion of the sealer, opposite the lip portion, extends into the annular space between the inner pipe and the outer pipe.

4. The method of claim 1, wherein greater than or equal to half of a length of the sealer is disposed in the annular space.

5. The method of claim 1, wherein the first sealing piece and the second sealing piece are connected with tongue and groove portions located on each of the first sealing piece or the second sealing piece.

6. The method of claim 1, wherein the first sealing piece and the second sealing piece are connected by an adhesive, screws, clamps, O rings, retainer screws, or a combination thereof.

7. The method of claim 1, wherein the sealer is removably attached to the inner piper and the outer pipe.

8. The method of claim 1, wherein an outer surface of the sealer is flush with an inner surface of the outer pipe.

9. The method of claim 1, wherein an inner surface of the sealer is flush with an outer surface of the inner pipe.

10. The method of claim 1, wherein the sealer comprises a material compatible with that of double-walled pipe.

11. A sealer configured to seal an opening between pipes in a double-walled pipe, the sealer comprising:

a first sealing piece having a rounded cross-section with an attachment portion configured to engage a corresponding attachment portion disposed on a second sealing piece, wherein at least one of the first sealing piece and the second sealing piece includes a thread disposed on at least one of a top surface and a front surface, wherein the first sealing piece and the second sealing piece are connected with a tongue and groove configuration.

12. The sealer of claim 11, wherein the first sealing piece and the second sealing piece are connected via an adhesive, screws, clamps, or a combination thereof.

13. A double-walled pipe having a sealer between an annular space, comprising:

an inner pipe;

an outer pipe disposed around the inner pipe, wherein the inner pipe extends beyond the outer pipe;

a first sealing piece having a round cross-section with an attachment portion configured to engage a corresponding attachment portion on a second sealing piece, wherein the first sealing piece and the second sealing piece form the sealer, wherein at least one of the first sealing piece and the second sealing piece includes a thread disposed on at least one of a top surface and a front surface;

wherein the sealer is disposed in the annular space between the inner pipe and the outer pipe; and wherein the first sealing piece and the second sealing piece are connected with a tongue and groove configuration.

14. The double-walled pipe of claim 13, wherein the sealer is removably attached to the inner pipe and the outer pipe.

15. The double-walled pipe of claim 13, wherein the first sealing piece and the second sealing piece each contain a lip portion configured to engage with an outer rim on the outer pipe forming a seal around the annular space.

16. The double-walled pipe of claim 13, wherein an outer surface of the sealer is flush with an inner surface of the outer pipe.

17. The double-walled pipe of claim 13, wherein an inner surface of the sealer is flush with an outer surface of the inner pipe.

18. The double-walled pipe of claim 13, wherein the first sealing piece and the second sealing piece include a first thread disposed on a top surface and a second thread disposed on a front surface.

19. The double-walled pipe of claim 18, wherein at least one of the threads disposed on the front surface of the first sealing piece and the second sealing piece is connected to an access port extending from the thread and along a longitudinal axis of the sealer configured to provide access to the annular space in double-walled pipe.

20. A method of sealing an annular space in double-walled pipe including the following steps:

applying a sealing piece to an inner pipe of double-walled pipe, wherein the sealing piece covers a circumference of the inner pipe, wherein the sealing piece includes a thread disposed on at least one of a top surface and a front surface;

wherein the sealing piece is disposed in the annular space located between the inner pipe and an outer pipe, wherein the sealing piece comprises greater than or equal to two pieces, and wherein when joined together, the pieces form the sealing piece, wherein the first sealing piece and the second sealing piece are connected with a tongue and groove configuration.

* * * * *